United States Patent Office 3,535,327
Patented Oct. 20, 1970

3,535,327
5-OXO-1,2,3,4-TETRAHYDRO-5H-[1]BENZO-PYRANO[3,4-d]PYRIDINES
Harry G. Pars, Lexington, and Felix E. Granchelli, Arlington, Mass., assignors, by mesne assignments, to Arthur D. Little, Inc., Cambridge, Mass., a corporation of Massachusetts
No Drawing. Continuation-in-part of application Ser. No. 490,687, Sept. 27, 1965. This application Mar. 17, 1969, Ser. No. 807,951
Int. Cl. C07d 31/34
U.S. Cl. 260—295                                     4 Claims

ABSTRACT OF THE DISCLOSURE

New 8-alkyl- (and 8-cycloalkyl-lower-alkyl-) 10-hydroxy - 5 - oxo - 1,2,3,4 - tetrahydro - 5H - [1]benzopyrano[3,4-d]pyridines and 10-alkyl- (and 10-cycloalkyl-lower-alkyl - ) 8 - hydroxy - 5 - oxo - 1,2,3,4 - tetrahydro-5H - [1]benzopyrano[3,4 - d]pyridine useful as intermediates for preparing 8-alkyl- and 8-cycloalkyl-lower-alkyl-), 5,5 - di - lower - alkyl - 10 - hydroxy - 1,2,3,4 - tetrahydro - 5H - [1]benzopyrano[3,4 - d]pyridines and 10-alkyl- (and 10-cycloalkyl-lower-alkyl-) 5,5-di-lower-alkyl - 8 - hydroxy - 1,2,3,4 - tetrahydro - 5H - [1]benzopyrano[3,4-d]pyridines are prepared by reaction of a 4-carbo-lower-alkoxy-3-piperidone with a 5-alkylresorcinol (or a 5-cycloalkyl-lower-alkylresorcinol).

---

This application is a continuation-in-part of our prior application Ser. No. 490,687, filed Sept. 27, 1965.

This invention relates to novel chemical compositions of matter known in the art of chemistry as 5-oxo-1,2,3,4-tetrahydro - 5H - [1]benzopyrano[3,4 - d]pyridines which are useful as intermediates for the preparation of 5,5-di-lower - alkyl - 1,2,3,4 - tetrahydro - 5H - [1]benzopyrano [3,4-d]pyridines, the latter having utility as psychotropic agents.

The invention sought to be patented resides in the concept of a class of chemical compounds which we designate as 8-alkyl- (and 8-cycloalkyl-lower-alkyl-) 10-hydroxy-5-oxo - 1,2,3,4 - tetrahydro - 5H - [1]benzopyrano[3,4 - d] pyridines and 10-alkyl- (and 10-cycloalkyl-lower-alkyl-) 8 - hydroxy - 5 - oxo - 1,2,3,4 - tetrahydro - 5H - [1] benzopyrano[3,4-d]pyridines.

Without limiting the generality of the foregoing, illustrative and preferred embodiments of our 8-alkyl- (and 8 - cycloalkyl - lower - alkyl-) 10 - hydroxy - 5 - oxo-1,2,3,4 - tetrahydro - 5H - [1]benzopyrano[3,4 - d] pyridines and 10-alkyl- (and 10-cycloalkyl-lower-alkyl-) 8 - hydroxy - 5 - oxo - 1,2,3,4 - tetrahydro - 5H - [1] benzopyrano[3,4-d]pyridines are those of Formula I:

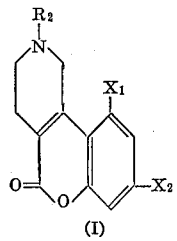

(I)

wherein one of $X_1$ and $X_2$ is hydroxy (HO) and the other is $R_1$; $R_1$ is a member of the group consisting of alkyl and cyclo-alkyl-lower-alkyl; and $R_2$ is a member of the group consisting of hydrogen, cycloalkyl-lower-alkyl, lower-alkenyl, lower-alkynyl, halo-lower-alkenyl (including fluoro-, chloro-, bromo-, and iodo-lower-alkenyl), phenyl-lower-alkyl, phenyl-lower-alkenyl, and phenyl-lower-alkynyl.

As used herein, the term "lower-alkyl" means saturated monovalent aliphatic radicals, including straight and branched-chain radicals, of from one to six carbon atoms, as illustrated by, but not limited to methyl, ethyl, propyl, isopropyl, butyl, sec.-butyl, amyl, or hexyl.

As used herein, the term "alkyl" means saturated, monovalent aliphatic radicals, including straight and branched-chain radicals, of from one to twenty carbon atoms, as illustrated by, but not limited to methyl, n-amyl, n-hexyl, 2-heptyl, n-heptyl, 3-methyl-2-octyl, n-octyl, 2-nonyl, 2-tetradecyl, n-hexadecyl, or 2-eicosanyl.

As used herein, the term "lower-alkenyl" means monovalent, aliphatic radicals of from three to seven carbon atoms which contain at least one double bond, and are either straight or branched-chain, as illustrated by, but not limited to 1-(2-propenyl), 1-(3-methyl-2-propenyl), 1-(1,3-dimethyl-2-propenyl), or 1-(2-hexenyl).

As used herein, the term "lower-alkynyl" means monovalent, alphatic radicals of from three to seven carbon atoms which contain at least one triple bond, and are either straight or branched, as illustrated by, but not limited to 1-(2-propynyl), 1-(1-methyl-2-propynyl), or 1-(2-heptynyl).

As used herein, the term "cycloalkyl" means cyclic, saturated aliphatic radicals of from three to eight ring carbon atoms, as illustrated by, but not limited to cyclopropyl, cyclobutyl, 2-methylcyclobutyl, cyclohexyl, 4-methylcyclohexyl, or cyclooctyl.

As used herein, the terms "phenyl - lower - alkyl," "phenyl-lower-alkenyl," and "phenyl-lower-alkynyl" mean monovalent radicals consisting of a phenyl nucleus bonded to the rest of the molecule through, respectively, a divalent lower-alkylene radical of from one to four carbon atoms, as illustrated by, but not limited to methylene, 1,1-ethylene, 1,2-ethylene, 1,3-propylene, 1,2-propylene, or 1,4-butylene; or through a divalent lower-alkenylene radical of from two to four carbon atoms, as illustrated by, but not limited to 1,2-ethenylene, 1,3-(1-propenylene), 1,3-(1-butenylene), or 1,4-(2-butenylene); or through a divalent lower-alkynylene radical of from two to four carbon atoms, as illustrated by, but not limited to 1,2-ethynylene, 1,3-propynylene,1,3-(1-butynylene), and the like. Moreover the benzene ring of such phenyl-lower-alkyl, phenyl-lower-alkenyl, and phenyl-lower-alkynyl radicals can be substituted by one or more substituents selected from the group consisting of lower-alkyl, lower-alkoxy, halo (chloro, bromo, iodo, or fluoro), nitro, lower-alkylmercapto, methylenedioxy, and trifluoromethyl.

The compounds of Formula I above where $R_3$ is benzyl are advantageously prepared by reacting a 1-benzyl-4-carbo-lower-alkoxy-3-piperidone of Formula II with a 5-alkylresorcinol (or a 5-cycloalkyl-lower-alkylresorcinol) of Formula III. The reaction is carried out in a mixture of concentrated sulfuric acid and phosphorus oxychloride or in the presence of other condensation agents such as aluminum chloride, hydrogen chloride, or polyphosphoric acid and is illustrated by the equation:

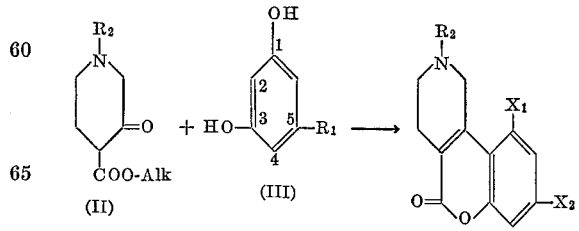

where $R_1$, $R_2$, $X_1$, and $X_2$ are defined as above. As indicated above, the cyclization of the 1-benzyl-4-carbo-lower-alkoxy-3-piperidone of Formula II takes place at either the 2-position of the 5-alkyl-resorcinol (to give the compounds of Formula I where $X_1$ is hydroxy and $X_2$ is $R_1$) or at the 4-position of the latter (to give the compounds of Formula I where $X_2$ is hydroxy and $X_1$ is $R_1$).

The compounds of Formula I where $R_2$ is hydrogen are advantageously prepared by catalytic debenzylation of the corresponding compounds where $R_2$ is benzyl. The reaction is preferably carried out in an organic solvent inert under the conditions of the reaction, for example methanol, ethanol, or isopropanol. Suitable catalysts are platinum or palladium-on-charcoal. A preferred catalyst is palladium-on-charcoal.

The compounds of Formula I where $R_2$ is cycloalkyl-lower-alkyl, lower-alkenyl, lower-alkynyl, halo-lower-alkenyl, phenyl - lower - alkyl, phenyl-lower-alkenyl, or phenyl - lower - alkynyl are advantageously prepared by reaction, in the presence of an acid - acceptor, of the corresponding compounds where $R_2$ is hydrogen with an appropriate cycloalkyl-lower-alkyl halide, lower-alkenyl halide, lower-alkynyl halide, halo-lower-alkenyl halide, phenyl-lower-alkyl halide, phenyl-lower-alkenyl halide, or phenyl-lower-alkynyl halide.

The reaction is preferably carried out in an organic solvent inert under the conditions of the reaction, for example methanol, ethanol, isopropanol, or dimethylformamide, and in the presence of an acid-acceptor. The purpose of the acid-acceptor is to take up the hydrogen halide split out during the course of the reaction and is a basic substance which forms water-soluble salts readily separable from the reaction mixture. Suitable acid-acceptors are alkali metal carbonates or bicarbonates, for example sodium or potassium carbonate, or bicarbonate, or alkali metal hydroxides, for example sodium or potassium hydroxide. The reaction can also be carried out in the presence of a molar excess of the base of Formula I where $R_2$ is hydrogen. A preferred acid-acceptor is sodium carbonate, and a preferred solvent is ethanol.

The intermediate 5-alkyl- or 5-cycloalkyl-lower-alkyl-resorcinols of Formula III are conveniently prepared by methods generally known in the art comprising dehydration of a 3,5-di-lower-alkoxyphenyl alkyl (or cycloalkyl-lower-alkyl) carbinol, reduction of the resulting 3,5-di-lower - alkaxyphenylalkene (or di-lower-alkoxyphenyl-cycloalkyl-lower-alkene), and hydriodic acid cleavage of the ether groups to the corresponding 5-alkyl- (or 5-cycloalkyl-lower-alkyl-) resorcinol. The starting carbinols in turn are prepared by reaction of an appropriate Grignard reagent with a 3,5-di-lower-alkoxybenzoic acid ester, amide, or 3′,5′-di - lower-alkoxy-alkanophenone (or 3′,5′-di-lower-alkoxy-cyclo-alkyl-lower-alkanophenone).

The intermediate 1-benzyl - 4 - carbo-lower-alkoxy-3-piperidones of Formula II are prepared by the method of Prill and McElvain, J. Am. Chem. Soc., 55, 1233 (1933) and of McElvain and Vozza, J. Am. Chem. Soc., 71, 896 (1948).

The compounds of Formula I as described hereinabove are used as intermediates for the preparation of 8-alkyl- (or 8-cycloalkyl-lower-alkyl-) 5,5 - di-lower-alkyl-10-hydroxy-1,2,3,4-tetrahydro - 5H - [1]benzopyrano[3,4-d]-pyridines and 10-alkyl- (and 10-cycloalkyl-lower-alkyl-) 5,5-di-lower-alkyl - 8 - hydroxy-1,2,3,4-tetrahydro-5H-[1]benzopyrano[3,4-d]pyridines of Formula IV:

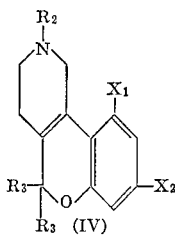

where $R_1$, $R_2$, $X_1$, and $X_2$ have the meanings given above, and $R_3$ represents lower-alkyl. The compounds of Formula IV where $X_1$ is hydroxy and $X_2$ is $R_1$ are disclosed and claimed in our copending application, Ser. No. 490,687, filed Sept. 27, 1965.

The compounds of Formula IV are prepared by reacting an 8-alkyl- (or 8-cycloalkyl-lower-alkyl-) 10-hydroxy-5-oxo-1,2,3,4-tetrahydro - 5H - [1]benzopyrano[3,4-d]-pyridine or 10-alkyl- (or 10-cycloalkyl-lower alkyl-) 8-hydroxy-5-oxo-1,2,3,4-tetrahydro - 5H - [1]benzopyrano-[3,4-d]pyridine of the instant invention having the Formula I hereinabove with a lower-alkyl magnesium halide as illustrated by the equation:

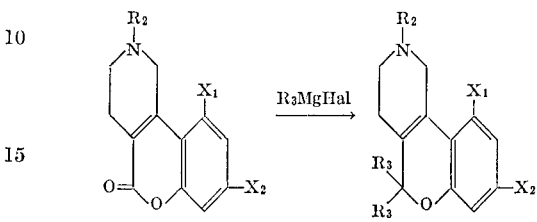

where $R_1$, $R_2$, $R_3$, $X_1$, and $X_2$ have the meanings given hereinabove, and Hal represents halogen. The reaction is carried out in an organic solvent inert under the conditions of the reaction. Suitable solvents are diethyl ether, dibutyl ether, tetrahydrofuran, anisole, pyridine, and the like. It is preferred to add a solution of the 8-alkyl- (or 8-cycloalkyl-lower-alkyl-) 10-hydroxy - 5 - oxo-1,2,3,4-tetrahydro - 5H - [1]benzopyrano[3,4-d]pyridine or 10-alkyl- (or 10-cycloalkyl-lower-alkyl-) 8 - hydroxy-5-oxo-1,2,3,4-tetrahydro-5H - [1]benzopyrano[3,4-d]pyridine in a pyridine or anisole solution, or in a mixture of these solvents, to a solution of the Grignard reagent in anisole.

Due to the presence of a basic amino grouping, the compounds of this invention form acid-addition salts. The compounds of Formula I, in free base form, are converted to the acid-addition salt form by interaction of the base with an acid. In like manner, the free bases can be regenerated from the acid-addition salt form in the conventional manner, that is by treating the salts with strong aqueous bases, for example alkali metal hydroxides, alkali metal carbonates, and alkali metal bicarbonates. The bases thus regenerated can then be interacted with the same or a different acid to give back the same or different acid-addition salt. Thus the novel bases and all of their acid-addition salts are readily interconvertible. It will thus be appreciated that Formula I not only represents the structural configuration of the bases of our invention but is also representative of the structural entity which is common to all if our compounds of Formula I whether in the form of the free bases or in the form of the salts of the bases.

Our salts are useful as characterizing or identifying derivatives of the free bases or in isolation or purification procedures. Such characterizing or purification acid-addition salt derivatives, like all of the acid-addition salts, can if desired, be used to regenerate the free bases by reaction of the salts with aqueous base, or alternatively the acid-addition salt can be converted to a different characterizing or identifying salt by, for example, ion-exchange procedures. Therefore although insolubility or lack of crystalline character may make some particular salt species unsuitable or less desirable for use as such in a given identification or purification procedure, such salts can be converted to the free base by decomposition of the acid-addition salt with aqueous base as explained above, or alternatively, the acid-addition salt can be converted to a more suitable salt species by double decomposition reactions involving the anion, for example, by ion-exchange procedures.

It will be appreciated from the foregoing that all of the acid-addition salts of our new bases are useful and valuable compounds regardless of considerations of solubility, physical form, and the like, and accordingly are within the purview of the instant invention.

The novel features of the compounds of the invention, then, reside in the concept of the bases and the cationic forms of the new compounds of Formula I and not in any particular acid moiety or anion associated with the salt forms of the compounds; rather, the acid moieties or anions which can be associated in the salt forms are in themselves neither novel nor critical and therefore can be any anion or acid-like substance capable of salt formation with bases. In fact, in aqueous solutions, the base form or water-soluble of acid-addition salt form of the compounds of the invention both possess a common protonated cation or ammonium ion.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexane-carboxylic acid, mandelic acid, tropic acid, crotonic acid, acetylene dicarboxylic acid, sorbic acid, 2 - furancarboxylic acid, cholic acid, pyrenecarboxylic acid, 2 - pyridinecarboxylic acid, 3-indoleacetic acid, quinic acid, sulfamic acid, methanesulfonic acid, isethionic acid, benezenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphinic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, or boron trifluoride.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The compounds of Formula IV, which are disclosed and claimed in parent application Ser. No. 490,687, have been shown to possess central nervous system depressant activity as evidenced by gross overt changes induced by intravenous administration in mice in standard tests as described by Irwin in Animal and Clinical Pharmacologic Techniques in Drug Evaluation (edited by Nodine and Siegler), Year Book Medical Publishers, Inc., Chicago, Ill., pp 36–54 (1964), which tests involve observations of psychomotor activity, reactivity to stimuli, and ability to perform normal, non-conditioned motor tasks. This activity indicates the usefulness of the compounds of Formula IV as psychotropic agents.

The molecular structures of the compounds of our invention were assigned on the basis of study of their infrared, ultraviolet, and NMR spectra and their transformation products, and conformed by the correspondence between calculated and found values for the elementary analyses for representative examples.

The following examples will further illustrate the invention without, however, limiting it thereto.

EXAMPLE 1

2 - benzyl-10-hydroxy-8-(3-methyl-2-octyl)-5-oxo-1,2,3,4-tetrahydro-5H-[1]benzopyrano[3,4 - d]pyridinehydrochloride To a mixture of 5.4 g. (0.023 mole) of 5-(3-methyl-2-octyl)resorcinol and 5.8 (0.020 mole) of N-benzyl-4-carbethoxy-3-piperidone [prepared according to the procedure of Iselin et al., Helv. Chim. Acta, 37, 178–184 (1954) and McElvain et al., J. Am. Chem. Soc, 71, 896–900, 1948)] was added dropwise with cooling 10.5 ml. of concentrated sulfuric acid. The mixture was then treated all at once with 3 ml. of phosphorus oxychloride, stirred at room temperature for twenty-four hours and then poured into an excess of aqueous sodium bicarbonate. The gum which separated was taken into chloroform, and the organic solution was washed first with aqueous sodium bicarbonate, then with water, and dried, first by azeotropic distillation, and then over anhydrous sodium sulfate. The chloroform solution was taken to dryness, and the residue extracted with acetonitrile and filtered. The combined filtrates were evaporated to dryness giving a dark, viscous gum which was dissolved in ethyl acetate and treated with a solution of concentrated hydrochloric acid in ethyl acetate. The solid which separated was collected, washed with ethyl acetate, and dried to give 2.3 g. of 2-benzyl-10-hydroxy-8-(3-methyl-2-octyl) - 5 - oxo-1,2,3,4-tetrahydro-5H-[1]benzopyrano[3, 4-d]pyridine hydrochloride, M.P. 217–222° C. (dec.). (The free base melts at 137–138° C.)

The latter was converted to 2-benzyl-5,5-dimethyl-10-hydroxy - 8 - (3-methyl-2-octyl)-1,2,3,-tetrahydro-5H-[1] benzopyrano[3,4-d]pyridine as follows:

The above described 2-benzyl-10-hydroxy-8-(3-methyl-2 - octyl) - 5 - oxo-1,2,3,4-tetrahydro-5H-[1]benzopyrano [3,4-d]pyridine (4.3 g., 0.01 mole), in the form of the free base, was dissolved in 30 ml. of dry anisole, and the solution added dropwise to a solution containing 0.1 mole of freshly prepared methyl magnesium iodide in 50 ml. of anisole. The solution was stirred overnight at 50° C., cooled, and the excess Grignard reagent decomposed with 50 ml. of water. The solution was acidified with 100 ml. of 4 N sulfuric acid, the anisole was steam distilled from the mixture, and the residual solution was basified with solid sodium carbonate and filtered. Extraction of the solid filter with cold acetonitrile, filteration of the extracts, and evaporation of the latter to dryness afforded 5.2 g. of a mossygreen solid, M.P. 92–112° C., which was further extracted with ether leaving 2.4 g. of a light blue solid, M.P. 197–200° C. as the hydriodide salt. Recrystallization from a mixture of ether and ethyl acetate raised the melting point to 202–205° C.

*Analysis.*—Calcd. for $C_{30}H_{42}INO_2$ (percent): C, 62.60; H, 7.35; N, 2.43. Found (percent): C, 62.46; H. 7.24; N, 2.67.

The salt can be converted to the free base by dissolving in chloroform and shaking with aqueous sodium bicarbonate. The free base precipitated from solution and remained suspended in the chloroform layer. The base was filtered off, washed with water and finally with chloroform. The product was recrystallized from acetonitrile to give colorless crystals, M.P. 202–204° C.

EXAMPLE 2

2-benzyl-10-hydroxy-8-methyl-5-oxo-1,2,3,4-tetrahydro-5H-[1]benzopyrano[3,4-d]pyridine Following a procedure similar to that described in Example 1 hereinabove, N-benzyl-4-carbethoxy-3-piperidone is reacted with 5-methylresorcinol to give 2-benzyl-10 - hydroxy - 8-methyl-5-oxo-1,2,3,4-tetrahydro-5H-[1] benzopyrano[3,4-d]pyridine.

The latter, on reaction with methyl magnesium iodide according to the procedure of Example 1 hereinabove, gives 2-benzyl-10-hydroxy-5,5,8-trimethyl-1,2,3,4-tetrahydro-5-H-[1]benzopyrano[3,4-d]pyridine.

EXAMPLE 3

2-benzyl-1-hydroxy-5-oxo-8-(1-pentyl)-1,2,3,4-tetrahydro-5H-[1]benzopyrano[3,4-d]pyridine Following a procedure similar to that described in Example 1 hereinabove, 5-(1-pentyl)resorcinol is reacted with N-benzyl-4-carbethoxy-3-piperidone hydrochloride in the presence of concentrated sulfuric acid and phosphorus oxychloride to give a mixture of 2-benzyl-1-hydroxy-5-oxo - 8-(1-pentyl)-1,2,3,4-tetrahydro-5H-[1]benzopyrano [3,4-d]pyridine, M.P. 180–181° C., and 2-benzyl-8-hydroxy - 5 - oxo-10-(1-pentyl)-1,2,3,4-tetrahydro-5H-[1] benzopyrano[3,4-d]pyridine, M.P. 175–176° C. These were separated by extraction with dichloromethane which dissolved the latter isomer and precipitated the former. The former was recrystallized from acetonitrile to give crystals, M.P. 180–181° C. The latter was recrystallized from a mixture of chloroform and petroleum ether, M.P. 175–176° C.

These two isomers were separately reacted with methyl magnesium bromide or iodide according to the procedure of Example 1 hereinabove, to give, respectively, 2-benzyl-5,5 - di - methyl - 1 - hydroxy-8-(1-pentyl)-1,2,3,4-tetrahydro - 5H - [1]benzopyrano[3,4-d]pyridine, M.P. 202–203° C.

*Analysis.*—Calc'd for $C_{26}H_{33}NO_2$ (percent): C, 79.75; H, 8.50; N, 3.58. Found (percent): C, 79.83; H, 8.47; N, 3.48, and 2-benzyl-5,5-dimethyl-8-hydroxy-10-(1-pentyl) - 1,2,3,4 - tetrahydro - 5H - [1]benzopyrano[3,4-d]pyridine, M.P. 153–154° C. *Analysis.*—Found (percent): C, 79.64; H, 8.42; N, 3.56.

EXAMPLE 4

(A) 5-(2-heptyl)resorcinol

A solution of 45 g. (0.19 mole) of 3′,5′-dimethoxyhexanophenone in 400 ml. of dry ether was added dropwise to a freshly prepared solution of 0.30 mole of methyl magnesium iodide in 150 ml. of ether. The mixture was heated under reflux for one hour, cooled, and carefully decomposed with 275 ml. of saturated aqueous ammonium chloride. Separation of the ether layer, extraction of the aqueous phase with ether, and evaporation of the dried, combined extracts to dryness afforded 49.4 g. of 2-(3,5-dimethoxyphenyl)-2-heptanol as an oil, which was not further purified.

The latter was treated with 1 ml. of 20% sulfuric acid and heated at 105–125° C./35 mm. for an hour and a half. The mixture was then cooled and extracted with ether, and the ether extracts washed with aqueous sodium bicarbonate and water, dried over sodium sulfate, and evaporated to dryness. Distillation of the residue in vacuo gave 34.1 g. of 2-(3,5-dimethoxyphenyl)-2-heptene, B.P. 132–140° C./4 mm., $n_D^{25}$ 1.5251.

The latter (33 g., 0.14 mole), dissolved in 100 ml. of absolute ethanol, was reduced with hydrogen at 1500 pounds p.s.i. over 6 g. of Raney nickel at 150° C. After removing the catalyst by filtration and evaporation of the filtrate to dryness, the residue was distilled in vacuo to give 26 g. of 2-(3,4-dimethoxyphenyl)heptane, B.P. 137–139° C./1 mm., $n_D^{25}$ 1.4957.

The latter (26 g., 0.11 mole), dissolved in 118 ml. (0.9 mole) of 57% hydriodic acid, was treated carefully with 156 ml. (1.6 moles) of acetic anhydride. When the exothermic reaction had subsided, the mixture was heated in an oil bath at 155° C. for two hours, cooled, and poured into a mixture of ice and water. The mixture was stored in a refrigerator overnight, and the gummy semisolid which separated was collected, washed with water, and dried over sulfuric acid to give 22.1 g. of 5-(2-heptyl)resorcinol which was not purified further.

(B) 2-benzyl-8-(2-heptyl)-10-hydroxy-5-oxo-1,2,3,4-tetrahydro-5H-[1]benzopyrano[3,4-d]pyridine Following a procedure similar to that described in Example 1 hereinabove, N-benzyl-4-carbethoxy-3-piperidone hydrochloride is reacted with 5-(2-heptyl)resorcinol in the presence of concentrated sulfuric acid and phosphorus oxychloride to give 2-benzyl-8-(2-heptyl)-10-hydroxy - 5 - oxo - 1,2,3,4-tetrahydro-5H-[1]benzopyrano [3,4-d]pyridine.

The latter, on reaction with methyl magnesium iodide according to the procedure of Example 1 hereinabove, gives 2-benzyl - 5,5 - dimethyl - 8-(2-heptyl)-10-hydroxy-1,2,3,4-tetrahydro-5H-[1]benzopyrano[3,4-d]pyridine.

EXAMPLE 5

(A) 5-(1-cyclohexylethyl)resorcinol

To a solution of cyclohexyl magnesium chloride [prepared from 177.1 g. (1.5 moles) of chlorocyclohexane and 24.3 g. (1.0 g. atom) of magnesium] in 300 ml. of ether was added 45.2 g. (0.25 mole) of 3,5-dimethoxybenzamide in portions over a period of one hour The mixture was stirred and refluxed for fifty hours, allowed to stand at room temperature for sixty-four hours, and then poured into one liter of crushed ice and water containing 80 ml. of concentrated sulfuric acid. The organic layer was separated, the aqueous phase extracted with ether, and the combined ether extracts washed with saturated sodium chloride, dried over anhydrous magnesium sulfate, charcoaled, filtered, and taken to dryness yielding an oil which was distilled in vacuo to give 39.3 g. of cyclohexyl 3,5-dimethoxyphenyl ketone, B.P. 141–162° C./.01 mm., $n_D^{25}$ 1.5403.

The latter (39 g., 0.157 mole), dissolves in 200 ml. of ether, was reacted with 0.2 mole of methyl magnesium iodide following a procedure similar to that used in Example 4(A) hereinabove to give 40.6 g. of 1-cyclohexyl-1-(3,5-dimethoxyphenyl)-ethanol.

The latter was reacted with 1.0 ml. of 20% sulfuric acid at 130–140° C. for thirty minutes following a procedure similar to that used in Example 4(A) hereinabove to give 27.7 g. of [1-(3,5-dimethoxyphenyl)ethylidenyl] cyclohexane, B.P. 114–120° C./0.1 mm., $n_D^{25}$ 1.5408.

The latter (27 g., 0.11 mole) was reduced with hydrogen over Raney nickel following a procedure similar to that used in Example 4(A) hereinabove to give 20.8 g. of 5-(1-cyclohexylethyl) - 1,3 - dimethoxybenzene, B.P. 115–118° C./0.12 mm., $n_D^{25}$ 1.5262. The latter (0.084 mole) was demethylated with 84 ml. of hydriodic acid in 84 ml. of acetic anhydride following a procedure similar to that used in Example 4(A) hereinabove to give 14.7 g. of 5-(1-cyclohexylethyl)resorcinol, M.P. 65–69° C.

(B) 2-benzyl-8-(1-cyclohexylethyl)-10-hydroxy-5-oxo-1,2,3,4-tetrahydro-5H-[1]benzopyranro[3-4-d]pyridine Following a procedure similar to that described in Example 1 hereinabove, N-benzyl-4-carbethoxy-3-piperidone hydrochloride is reacted with 5-(1-cyclohexylethyl)resorcinol in the presence of concentrated sulfuric acid and phosphorus oxychloride to give 2-benzyl-8-(1-cyclohexylethyl)-10-hydroxy - 5 - oxo-1,2,3,4-tetrahydro-5H-[1]benzopyrano[3,4-d]pyridine and 2-benzyl-10-(1-cyclohexylethyl)-8-hydroxy - 5-oxo-1,2,3,4-tetrahydro-5H-[1]benzopyrano[3,4-d]pyridine.

The latter, on reaction with methyl magnesium iodide according to the procedure of Example 1 hereinabove, gives respectively, 2-benzyl-8-(1-cyclohexylethyl)-5,5-dimethyl - 10 - hydroxy-1,2,3,4-tetrahydro-5H[1]benzopyrano[3,4-d]pyridine and 2-benzyl-10-(1-cyclohexylethyl)-5,5-dimethyl-8-hydroxy-1,2,3,4-tetrahydro-5H - [1]benzopyrano[3,4-d]pyridine.

EXAMPLE 6

(A) 5-(3-cyclopropyl-2-propyl)resorcinol

By reacting cyclopropylmethyl magnesium bromide with 3,5-dimethoxybenzamide; reacting the resulting cyclopropylmethyl 3,5-dimethoxyphenyl ketone with methyl magnesium iodide; dehydrating the resulting 1-cyclopropyl-2-(3,5-dimethoxyphenyl)-2-propanol with 20% sulfuric acid; reducing with hydrogen over Raney nickel the resulting 1-cyclopropyl-2-(3,5-dimethoxyphenyl) - 1-propene; and demethylating the resulting 1-cyclopropyl-2-(3, 5-dimethoxphenyl)propane with hydriodic acid in acetic anhydride using the manipulative procedures given above in Examples 4(A) and 5(A), there is obtained 5-(3-cyclopropyl-2-propyl)resorcinol.

(B) 2-benzyl-8 - (3-cyclopropyl-2-propyl) - 10-hydroxy-5-oxo-1,2,3,4-tetrahydro - 5H - [1]benzopyrano[3,4-d] pyridine Following a procedure similar to that described in Example 1 hereinabove, N-benzyl-4-carbethoxy-3-piperidone is reacted with 5-(3-cyclopropyl-2-propyl)resorcinol to give 2-benzyl-8-(3-cyclopropyl-2-propyl) - 10-hydroxy-5-oxo-1,2,3,4-tetrahydro - 5H - [1]benzopyrano[3,4-d]pyridine.

The latter, on reaction with methyl magnesium iodide according to the procedure of Example 1 hereinabove, gives 2-benzyl-8 - (3-cyclopropyl-2-propyl)-5,5-dimethyl-10-hydroxy - 1,2,3,4 - tetrahydro-5H-[1]benzopyrano[3,4-d]pyridine.

EXAMPLE 7

(A) 5-(2-tetradecyl)resorcinol

Following a procedure similar to that described in Example 5(A) hereinabove, 0.2 mole of a Grignard reagent prepared from 60 g. (0.24 mole) of 1-bromododecane and 4.8 g. (0.20 atom) of magnesium was reacted with 9.05 g. (0.05 mole) of 3,5-dimethoxybenzamide in diethyl ether, and the resulting 1-dodecyl 3,5-dimethoxyphenyl ketone (43 g., 0.13 mole) was reacted with methyl magnesium iodide using a procedure similar to that used in Example 4(A) hereinabove. Dehydration of the resulting 2-(3,5-dimethoxyphenyl)-2-tetradecanol (13.5 g., 0.039 mole) with 1 ml. of 20% sulfuric acid to the corresponding 2-(3,5-dimethoxyphenyl)-2-tetradecene, catalytic reduction of the latter (26 g., 0.078 mole) with hydrogen over 6 g. of Raney nickel and cleavage of the resulting 2-(3,5-dimethoxyphenyl)tetradecane (20 g., 0.06 mole) with 60 ml. of 57% hydriodic acid in 60 ml. of acetic anhydride, all according to the procedures described in Example 4(A) hereinabove, afforded 15.7 g. of 5-(2-tetradecyl)resorcinol, M.P. 61–63° C.

(B) 2-benzyl-10-hydroxy-5-oxo-8-(2-tetradecyl)-1,2,3,4-tetrahydro-5H-[1]benzopyrano[3,4-d]pyridine Following a procedure similar to that described in Example 1 hereinabove, N-benzyl-4-carbethoxy-3-piperidone is reacted with 5-(2-tetradecyl)resorcinol in the presence of concentrated sulfuric acid and phosphorus oxychloride to give 2-benzyl-10-hydroxy-5-oxo-8-(2-tetradecyl)-1,2,3,4-tetrahydro-5H-[1]benzopyranol[3,4-d]pyridine.

The latter, on reaction with methyl magnesium iodide following the procedure of Example 1 hereinabove, gives 2-benzyl-5,5-dimethyl-10-hydroxy-8 - (2-tetradecyl)1,2,3,4-tetrahydro-5H-[1]benzopyrano[3,4-d]pyridine.

EXAMPLE 8

(A) 5-(2-eicosyl)resorcinol

Following a procedure similar to that used in Example 5(A) hereinabove, a Grignard reagent, prepared from 333.4 g. (1.0 mole) of 1-bromooctadecane and 24.3 g. (1.0 g. atom) of magnesium in 500 ml. of anhydrous ether was treated with 45.2 g. (0.25 mole) of 3,5-dimethoxybenzamide to give 58.9 g. of 1-octadecyl 3,5-dimethoxyphenyl ketone, M.P. 67–71° C.

The latter (56.5 g., 0.135 mole), slurried in 600 ml. of anhydrous ether and 100 ml. of tetrahydrofuran, was reacted with 0.2 mole of freshly prepared methyl magnesium iodide in 100 ml. of anhydrous ether following a procedure similar to that used in Example 4(A) hereinabove to give 48.1 g. of 2-(3,5-dimethoxyphenyl)-2-eicosanol, M.P. 51–54° C.

The latter (27.1 g., 0.085 mole) was reacted with 1.0 ml. of 20% sulfuric acid at 130–140° C. for thirty minutes following a procedure similar to that used in Example 4(A) hereinabove to give 19.2 g. of 2-(3,5-dimethoxyphenyl)-2-eicosane, M.P. 35–37° C.

The latter (19 g., 0.046 mole) was reduced with hydrogen over 3 g. of Raney nickel following a procedure similar to that used in Example 4(A) hereinabove to give 14.8 g. of 2-(3,5-dimethoxyphenyl)eicosane which was demethylated with 35 ml. of 57% hydriodic acid in 35 ml. of acetic anhydride following a procedure similar to that used in Example 4(A) hereinabove to give 11.5 g. of 5-(2-eicosyl)resorcinol, M.P. 75.5–76.5° C.

(B) 2-benzyl-8-(2-eicosyl)-10-hydroxy-5-oxo-1,2,3,4-tetrahydro-5H-[1]benzopyrano[3,4-d]pyridine Following a procedure similar to that used in Example 1 hereinabove, N-benzyl4-carbethoxy-3-piperidone is reacted with 5-(2-eicosyl)resorcinol to give 2-benzyl-8-(2-eicosyl) - 10-hydroxy-5-oxo-1,2,3,4-tetrahydro-5H-[1]benzopyrano[3,4-d]pyridine.

The latter, on reaction with methyl magnesium iodide according to the procedure of Example 1 hereinabove, gives 2 - benzyl-5,5 - dimethyl-8-(2-eicosyl)-10-hydroxy-1,2,3,4-tetrahydro-5H-[1]benzopyrano[3,4-d]pyridine.

EXAMPLE 9

10 - hydroxy - 8 (3-methyl-2-octyl)-5-oxo-1,2,3,4-tetrahydro-5H-[1]benzopyrano[3,4-d]pyridine A solution of 2 g. (0.0046 mole) of 2-benzyl-10-hydroxy - 8 - (3 - methyl - 2 - octyl) - 5 - oxo - 1,2,3,4- tetrahydro-5H-[1]-benzopyrano[3,4-d]pyridine in 175 ml. of absolute ethanol and 10 ml. of glacial acetic acid was shaken with hydrogen at a pressure of 48.5 pounds p.s.i. in the presence of 0.5 g. of 10% palladium-on-charcoal. Reduction was complete after about 16 hours, and the mixture was then filtered, the filtrate evaporated to dryness, and the residue dissolved in chloroform and neutralized with aqueous potassium bicarbonate. The chloroform layer was filtered and evaporated to dryness, and the solid residue was recrystallized from acetonitrile giving 0.5 g. of 10 - hydroxy - 8 - (3-methyl-2-octyl)-5-oxo-1,2,3,4 - tetrahydro - 5H-[1]benzopyrano[3,4-d]pyridine, M.P. 172–175° C.

The latter, on reaction with methyl magnesium iodide according to the procedure of Example 1 hereinabove, gives 5,5 - dimethyl - 10 - hydroxy - 8 - (3 - methyl - 2-octyl) - 1,2,3,4 - tetrahydro - 5H - [1]benzopyrano[3,4-d] pyridine.

EXAMPLE 10

10-hydroxy-8-methyl-5-oxo-1,2,3-tetrahydro-5H-[1]benzopyrano[3,4-d]pyridine

Following a procedure similar to that described in Example 9 hereinabove, 2-benzyl-10-hydroxy-8-methyl-5-oxo - 1,2,3,4 - tetrahydro - 5H - [1]benzopyrano[3,4-d] pyridine is catalytically debenzylated with hydrogen in the presence of palladium-on-charcoal to give 10-hydroxy-8-methyl- 5 - oxo - 1,2,3,4 - tetrahydro-5H-[1]benzopyrano[3,4-d]pyridine.

The latter, on reaction with methyl magnesium iodide according to the procedure of Example 1 hereinabove, gives 5,5-dimethyl-10-hydroxy - 8 - methyl - 1,2,3,4-tetrahydro-5H-[1]-benzopyrano[3,4-d]pyridine.

EXAMPLE 11

8-(1-cyclohexylethyl)-10-hydroxy-5-oxo-1,2,3,4-tetrahydro-5H-[1]benzopyrano[3,4-d]pyridine Following a procedure similar to that described in Example 9 hereinabove, 2-benzyl-8-(1-cyclohexylethyl)-10 - hydroxy - 5 - oxo - 1,2,3,4-tetrahydro-5H-[1]benzopyrano[3,4-d]pyridine is catalytically debenzylated with hydrogen in the presence of palladium-on-charcoal to give 8 - (1 - cyclohexylethyl) - 10-hydroxy-5-oxo-1,2,3,4-tetrahydro-5H-[1]benzopyrano[3,4-d]pyridine.

The latter, on reaction with methyl magnesium iodide according to the procedure of Example 1 hereinabove, gives 8 - (1 - cyclohexylethyl)-5,5-dimethyl-10-hydroxy-1,2,3,4-tetrahydro-5H-[1]benzopyrano[3,4-d]pyridine.

EXAMPLE 12

8-(3-cyclopropyl-2-propyl)-10-hydroxy-5-oxo-1,2,3,4-tetrahydro-5H-[1]benzopyrano[3,4-d]pyridine Following a procedure similar to that described in Example 8 hereinabove, 2 - benzyl - 8 - (3-cyclopropyl-2-propyl) - 10 - hydroxy - 5 - oxo - 1,2,3,4 - tetrahydro - 5H-[1]benzopyrano[3,4-d]pyridine is catalytically debenzylated with hydrogen in the presence of palladium-on-charcoal to give 8 - (3 - cyclopropyl-2-propyl)-10-hydroxy-5-oxo - 1,2,3,4 - tetrahydro - 5H - [1]benzopyrano[3,4-d]-pyridine.

The latter, on reaction with methyl magnesium iodide according to the procedure of Example 1 hereinabove, gives 8 - (3 - cyclopropyl - 2 - propyl) - 10 - hydroxy-1,2,3,4 - tetrahydro - 5H-[1]benzopyrano[3,4-d]pyridine.

EXAMPLE 13

8-(2-eicosyl)-10-hydroxy-5-oxo-1,2,3,4-tetrahydro-5H-[1]benzopyrano[3,4-d]pyridine Following a procedure similar to that described in Example 9 hereinabove, 2 - benyl - 8 - (2 - eicosyl) - 10-hydroxy - 5 - oxo - 1,2,3,4-tetrahydro-5H-[1]benzopyrano[3,4-d]pyridine is catalytically debenzylated with hydrogen in the presence of palladium-on-charcoal to give 8-(2-eicosyl) - 10 - hydroxy - 5 - oxo - 1,2,3,4-tetrahydro-5H-[1]benzopyrano[3,4-d]pyridine.

The latter, on reaction with methyl magnesium iodide according to the procedure of Example 1 hereinabove, gives 5,5 - dimethyl - 8 - (2-eicosyl)-10-hydroxy-1,2,3,4-tetrahydro-5H-[1]benzopyrano[3,4-d]pyridine.

EXAMPLE 14

10 - hydroxy - 8 - (3-methyl-2-octyl)-2-[1-(2-propynyl)]-5 - oxo - 1,2,3,4 tetrahydro - 5H - [1]benzopyrano[3,4-d]pyridine hydrochloride A mixture of 1.42 g. (0.004 mole) of 10 - hydroxy-8-(3 - methyl - 2 - octyl) - 5 - oxo - 1,2,3,4-tetrahydro - 5H-[1]benzopyrano[3,4-d]pyridine hydrochloride, 0.48 g. (0.004 mole) of 3-bromo-1-propyne, and 0.6 g. of anhydrous sodium carbonate in 20 ml. of absolute ethanol was refluxed for 16 hours, cooled, and filtered. The filtrate was evaporated to dryness, the residue was extracted with boiling acetonitrile, and the extract cooled overnight in a refrigerator to remove a small quantity of a dark brown precipitate. After removal of the latter, the supernatant liquid was evaporated to drynes, the resulting solid was dissolved in a hexane/ether mixture, and the mixture cooled in an ice bath to cause the precipitation of a dark gum which was separated by decantation. The solution was evaporated to dryness once more, taken into ether, and the solution saturated with anhydrous hydrogen chloride. There was thus obtained 0.8 g. of 10-hydroxy-8-(3-methyl - 2 - octyl) - 2 - [1-(2-propynyl)]-5-oxo-1,2,3,4-tetrahydro - 5H - [1]benzopyrano[3,4-d]pyridine hydrochloride as a light tan crystalline solid, M.P. 127–131° C. (uncorr.).

The latter, on reaction with methyl magnesium iodide according to the procedure of Example 1 hereinabove, gives 5,5 - dimethyl - 10 - hydroxy - 8 - (3 - methyl - 2-octyl) - 2 - [1 - (2-propynl)]-1,2,3,4-tetrahydro-5H-[1]benzopyrano[3,4-d]pyridine.

EXAMPLE 15

10-hydroxy-8-methyl-5-oxo-2-[1-(2-propynyl)]-1,2,3,4-tetrahydro-5H-[1]benzopyrano[3,4-d]pyridine Proceeding in a manner similar to that described in Example 14 hereinabove, 10 - hydroxy - 8 - methyl-5-oxo-1,2,3,4 - tetrahydro-5H-[1]benzopyrano[3,4-d]pyridine is reacted with 3-bromo-1-propyne in absolute ethanol in the presence of anhydrous sodium carbonate to give 10-hydroxy - 8 - methyl-5-oxo-2-[1-(2-propynyl)]-1,2,3,4-tetrahydro-5H-[1]benzopyrano[3,4-d]pyridine.

The latter, on reaction with methyl magnesium iodide according to the procedure of Example 1 hereinabove, gives 5,5 - dimethyl - 10 - hydroxy - 8 - methyl - 2-[1-(2-propynyl)] - 1,2,3,4 - tetrahydro - 5H - [1]benzopyrano[3,4-d]pyridine.

EXAMPLE 16

8-(1-cyclohexylethyl)-10-hydroxy-5-oxo-2-[1-(2 - propynyl)] - 1,2,3,4 - tetrahydro - 5H - [1]benzopyrano[3,4-d]pyridine Following a procedure similar to that described in Example 14 hereinabove, 8-(1-cyclohexylethyl)-10-hydroxy-5-oxo - 1,2,3,4 - tetrahydro - 5H - [1]benzopyrano[3,4-d]pyridine is reacted with 3-bromo-1-propyne in absolute ethanol in the presence of anhydrous sodium carbonate to give 8-(1-cyclohexylethyl)-10-hydroxy-5-oxo-2-[1-(2-propynyl)] - 1,2,3,4 - tetrahydro - 5H - [1]benzopyrano-[3,4-d]pyridine.

The latter, on reaction with methyl magnesium iodide according to the procedure of Example 1 hereinabove, gives 8-(1-cyclohexylethyl)-5,5-dimethyl-10-hydroxy-2-[1-(2 - propynyl)] - 1,2,3,4 - tetrahydro-5H-[1]benzopyrano-[3,4-d]pyridine.

EXAMPLE 17

8-(3-cyclopropyl-2-propyl) - 10 - hydroxy-2-[1-(2-propynyl)] - 5 - oxo - 1,2,3,4 - tetrahydro-5H-[1]benzopyrano-[3,4-d]pyridine Following a procedure similar to that described in Example 14 hereinabove, 8-(3-cyclopropyl-2-propyl)-10-hydroxy-5-oxo - 1,2,3,4 - tetrahydro-5H-[1]benzopyrano-[3,4-d]pyridine is reacted with 3-bromo-1-propyne in absolute ethanol in the presence of anhydrous sodium carbonate to give 8-(3-cyclopropyl-2-propyl)-10-hydroxy-2-[1-(2-propynyl)] - 5 - oxo - 1,2,3,4 - tetrahydro-5H-[1]benzopyrano[3,4-d]pyridine.

The latter, on reaction with methyl magnesium iodide according to the procedure of Example 1 hereinabove, gives 8-(3-cyclopropyl - 2 - propyl) - 5,5 - dimethyl-10-hydroxy-2-[1-(2-propynyl)] - 1,2,3,4 - tetrahydro - 5H - [1] benzopyrano[3,4-d]pyridine.

EXAMPLE 18

8-(2-eicosyl) - 10 - hydroxy - 5 - oxo-2-[1-(2-propynyl)]-1,2,3,4-tetrahydro-5H-[1]benzopyrano[3,4-d]pyridine Following a procedure similar to that described in Example 14 hereinabove, 8-(2-eicosyl)-10-hydroxy-5-oxo-1,2,3,4 - tetrahydro-5H-[1]benzopyrano[3,4-d]pyridine is reacted with 3-bromo-1-propyne in absolute ethanol in the presence of anhydrous sodium carbonate to give 8-(2-eicosyl) - 10 - hydroxy - 5 - oxo-2[1-(2-propynyl)]-1,2,3,4-tetrahydro-5H-[1]benzopyrano[3,4-d]pyridine.

The latter, on reaction with methyl magnesium iodide according to the procedure of Example 1 hereinabove, gives 5,5-dimethyl-8-(2-eicosyl))-10-hydroxy-2-[1-(2-propynyl)] - 1,2,3,4 - tetrahydro-5H-[1]benzopyrano[3,4-d] pyridine.

EXAMPLE 19

2-cinnamyl-10-hydroxy-8-(3-methyl-2-octyl)-5-oxo-1,2,3,4-tetrahydro-5H-[1]benzopyrano[3,4-d]pyridine Following a procedure similar to that described in Example 14 hereinabove, 10-hydroxy-8-(3-methyl-2-octyl)-5 - oxo - 1,2,3,4 - tetrahydro-5H-[1]benzopyrano[3,4-d] pyridine is reacted with cinnamyl chloride in absolute ethanol in the presence of anhydrous sodium carbonate to give 2 - cinnamyl-10-hydroxy-8-(3-methyl-2-octyl)-5-oxo - 1,2,3,4 - tetrahydro - 5H - [1]benzopyrano[3,4-d] pyridine.

The latter, on reaction with methyl magnesium iodide according to the procedure described above in Example 1, gives 2-cinnamyl-5,5-dimethyl-10-hydroxy-8-(3-methyl-2-octyl) - 1,2,3,4 - tetrahydro - 5H - [1]benzopyrano[3,4-d] pyridine.

EXAMPLE 20

10-hydroxy-8-(3-methyl - 2 - octyl) - 5 - oxo-2-(2-phenylethyl) - 1,2,3,4 - tetrahydro-5H-[1]benzopyrano[3,4-d] pyridine Following a procedure similar to that described in Example 14 above, 10-hydroxy-8-(3-methyl-2-octyl)-5-oxo-1,2,3,4 - tetrahydro - 5H - [1]benzopyrano[3,4-d]pyridine is reacted with 2-phenylethyl bromide in absolute ethanol in the presence of anhydrous sodium carbonate to give 10-hydroxy-8-(3 - methyl - 2 - octyl)-5-oxo-2-(2-phenylethyl) - 1,2,3,4 - tetrahydro - 5H - [1]benzopyrano[3,4-d] pyridine.

The latter, on reaction with methyl magnesium iodide according to the procedure described above in Example 1, gives 5,5-dimethyl-10-hydroxy-8-(3-methyl-2-octyl)-2-(2-phenylethyl) - 1,2,3,4 - tetrahydro - 5H - [1]benzopyrano-[3,4-d]pyridine.

EXAMPLE 21

10-hydroxy-8-(3-methyl-2-octyl) - 2 - [2-(4-methylphenyl) ethyl]-5-oxo - 1,2,3,4 - tetrahydro-5H-[1]benzopyrano-[3,4-d]pyridine Following a procedure similar to that described in Example 14 hereinabove, 10-hydroxy-8-(3-methyl-2-octyl)-5-oxo - 1,2,3,4 - tetrahydro - 5H - [1]benzopyrano[3,4-d] pyridine is reacted with 2-(4-methylphenyl)ethyl bromide in absolute ethanol in the presence of anhydrous sodium carbonate to give 10-hydroxy-8-(3-methyl-2-octyl)-2-[2-(4-methylphenyl)ethyl] - 5 - oxo - 1,2,3,4 - tetrahydro-5H-[1]benzopyrano[3,4-d]pyridine.

The latter, on reaction with methyl magnesium iodide according to the procedure described above in Example 1, gives 5,5-dimethyl-10-hydroxy-8-(3-methyl-2-octyl)-2-[2-(4 - methylphenyl)ethyl] - 1,2,3,4 - tetrahydro - 5H - [1] benzopyrano[3,4-d]pyridine.

EXAMPLE 22

10-hydroxy-8-(3-methyl-2-octyl) - 2 - [3-(3,4-dimethoxyphenyl)propyl] - 5 - oxo - 1,2,3,4 - tetrahydro-5H-[1] benzopyrano[3,4-d]pyridine Following a procedure similar to that described in Example 14 hereinabove, 10-hydroxy-8-(3-methyl-2-octyl)-5-oxo - 1,2,3,4 - tetrahydro - 5H - [1]benzopyrano[3,4-d] pyridine is reacted with 3-(3,4-dimethoxyphenyl)propyl bromide in absolute ethanol in the presence of anhydrous sodium carbonate to give 10-hydroxy-8-(3-methyl-2-octyl)-2-[3-(3,4-dimethoxyphenyl)propyl] - 5 - oxo-1,2,3,4-tetrahydro-5H-[1]benzopyrano[3,4-d]pyridine The latter, on reaction with methyl magnesium iodide according to the procedure described in Example 1 hereinabove, gives 5,5-dimethyl-10-hydroxy-8-(3-methyl-2-octyl) - 2-[3-(3,4-dimethoxyphenyl)propyl]-1,2,3,4-tetrahydro-5H-[1]benzopyrano[3,4-d]pyridine.

EXAMPLE 23

10 - hydroxy - 8-(3-methyl-2-octyl)-5-oxo-2-[1-(2,4,6-tribromophenyl) - ethyl]-1,2,3,4-tetrahydro-5H-[1]benzopyrano[3,4-d]pyridine Following a procedure similar to that described in Example 14 hereinabove, 10-hydroxy-8-(3-methyl-2-octyl)-5-oxo-1,2,3,4-tetrahydro-5H-[1]benzopyrano[3,4 - d] pyridine is reacted with 1-(2,4,6-tribromophenyl)ethyl bromide in absolute ethanol in the presence of anhydrous sodium carbonate to give 10-hydroxy-8-(3-methyl-2-octyl) - 5 - oxo-2-[1-(2,4,6-tribromophenyl)ethyl]-1,2,3,4-tetrahydro-5H-[1]benzopyrano[3,4-d]pyridine.

The later, on reaction with methyl magnesium iodide according to the procedure described in Example 1 hereinabove gives 5,5-dimethyl - 10 - hydroxy-8-(methyl-2-octyl) - 2-[1 - (2,4,6-tribromophenyl)ethyl]-1,2,3,4-tetrahydro-5-H-[1]benzopyrano[3,4-d]pyridine.

EXAMPLE 24

10-hydroxy-8-(3-methyl - 2 - octyl)-2-[4-(4-nitrophenyl) butyl] - 5 - oxo-1,2,3,4-tetrahydro-5H[1]benzopyrano [3,4,-d]pyridine Following a procedure similar to that described in Example 14 hereinabove, 10-hydroxy-8-(3-methyl-2-octyl) - 5-oxo-1,2,3,4-tetrahydro-5H-[1]benzopyrano[3,4-d] pyridine is reacted with 4-(4-nitrophenyl)butyl bromide in absolute ethanol in the presence of anhydrous sodium carbonate to give 10-hydroxy-8-(3-methyl-2-octyl)-2-[4-(4 - nitrophenyl)butyl] - 5-oxo-1,2,3,4-tetrahydro-5H-[1] benzopyrano[3,4-d]pyridine.

The latter, on reaction with methyl magnesium iodide according to the procedure of Example 1 hereinabove, gives 5,5-dimethyl-10-hydroxy-8-(3-methyl - 2 - octyl)-2-[4-(4-nitrophenyl)-butyl] - 1,2,3,4 - tetrahydro - 5H - [1] benzopyrano[3,4-d]pyridine.

EXAMPLE 25

10-hydroxy-8-(methyl-2-octyl)-2-[2-(4 - methylmercaptophenyl)ethyl] - 5-oxo-1,2,3,4-tetrahydro-5H-[1]benzopyrano[3,4-d]pyridine Following a procedure similar to that described in Example 14 hereinabove, 10-hydroxy-8-(3-methyl-2-octyl)-5-oxo-1,2,3,4-tetrahydro-5H-[1]benzopyrano[3,4 - d]pyridine is reacted with 2-(4-methylmercaptophenyl)ethyl bromide in absolute ethanol in the presence of anhydrous sodium carbonate to give 10-hydroxy-8-(3-methyl-2-octyl) - 2-[2-(4-methylmercaptophenyl)ethyl]-5-oxo-1,2,3, 4-tetrahydro-5H-[1]benzopyrano[3,4-d]pyridine.

The latter, on reaction with methyl magnesium iodide according to the procedure described in Example 1 hereinabove, gives 5,5-dimethyl-10-hydroxy-8-(3-methyl-2-octyl) - 2-[2-(4-methylmercaptophenyl)ethyl]-1,2,3,4-tetrahydro-5H-[1]benzopyrano[3,4-d]pyridine.

EXAMPLE 26

10-hydroxy-8-(3-methyl-2-octyl)-2-{1 - [3 - (3,4-methylenedioxyphenyl)-2-butenyl]}-5-oxo-1,2,3,4 - tetrahydro-5H-[1]benzopyrano[3,4-d]pyridine Following a procedure similar to that described in Example 14 hereinabove, 10-hydroxy-8-(3-methyl-2-octyl) - 5 - oxo-1,2,3,4-tetrahydro-5H-[1]benzopyrano[3,4-d]pyridine is reacted with 3-[1-(3,4-methylenedioxyphenyl)-1-butenyl] bromide in absolute ethanol in the presence of anhydrous sodium carbonate to give 10-hydroxy-8 - (3 - methyl-2-octyl)-2-{1-[3-(3,4-methylenedioxyphenyl) - 2 - butenyl]} - 5 - oxo-1,2,3,4-tetrahydro-5H-[1]benzopyrano-[3,4-d]pyridine.

The latter, on reaction with methyl magnesium iodide according to the procedure described in Example 1 hereinabove, gives 5,5-dimethyl-10-hydroxy-8-(3-methyl-2-octyl) - 2 - {1-[3-(3,4-methylenedioxyphenyl)-2-butenyl]}-1,2,3,4-tetrahydro-5H-[1]benzopyrano[3,4-d]pyridine.

EXAMPLE 27

10 - hydroxy - 8-(3-methyl-2-octyl)-5-oxo-2-{1-[4-(3-trifluoromethylphenyl) - 3 - butenyl]}-1,2,3,4-tetrahydro-5H-[1]benzopyrano[3,4-d]pyridine Following a procedure similar to that described in Example 14 hereinabove, 10 - hydroxy-8-(3-methyl-2-octyl) - 5 - ozo - 1,2,3,4 - tetrahydro-5H-[1]benzopyrano[3,4-d] pyridine is reacted with 1-[4-(3-trifluoromethylphenyl)-3-butenyl] bromide in absolute ethanol in the presence of anhydrous sodium carbonate to give 10-hydroxy-8-(3-methyl - 2 - octyl)-5-oxo-2-{1-[4-(3-trifluoromethylphenyl) - 3 - butenyl]}-1,2,3,4-tetrahydro-5H-[1]benzopyrano-[3,4-d]pyridine.

The latter, on reaction with methyl magnesium iodide according to the procedure described in Example 1 hereinabove, gives 5,5-dimethyl-10-hydroxy-8-(3-methyl-2-octyl) - 2 - {1-[4-(3-trifluoromethylphenyl) - 3-butenyl]}-1, 2,3,4-tetrahydro-5H-[1]benzopyrano[3,4-d]pyridine.

EXAMPLE 28

2 - allyl - 10-hydroxy-8-(3-methyl-2-octyl)-5-oxo-1,2,3,4-tetrahydro-5H-[1]benzopyrano[3,4-d]pyridine Following a procedure similar to that described in Example 14 hereinabove, 10-hydroxy-8-(3-methyl-2-octyl)-5 - oxo - 1,2,3,4-tetrahydro-5H-[1]benzopyrano[3,4-d] pyridine is reacted with allyl bromide in absolute ethanol in the presence of anhydrous sodium carbonate to give 2 - allyl - 10-hydroxy-8-(3-methyl-2-octyl)-5-oxo-1,2,3,4-tetrahydro-5H-[1]benzopyrano[3,4-d]pyridine.

The latter, on reaction with methyl magnesium iodide according to the procedure of Example 1 hereinabove, gives 2 - allyl-5,5-dimethyl-10-hydroxy-8-(3-methyl-2-oc-

EXAMPLE 29

10 - hydroxy - 2 - [1-(3-methyl-2-butenyl)]-8-(3-methyl-2 - octyl)-5-oxo-1,2,3,4-tetrahydro-5H-[1]benzopyrano[3,4-d]pyridine Following a procedure similar to that described in Example 14 hereinabove, 10-hydroxy-8-(3-methyl-2-octyl) - 5 - oxo-1,2,3,4-tetrahydro-5H-[1]benzopyrano[3,4-d]pyridine is reacted with 1-bromo-3-methyl-2-butene in absolute ethanol in the presence of sodium carbonate to give 10-hydroxy-2-[1-(3-methyl-2-butenyl)]-8-(3-methyl-2 - octyl) - 5-oxo-1,2,3,4-tetrahydro-5H-[1]benzopyrano[3,4-d]pyridine.

The latter, on reaction with methyl magnesium iodide according to the procedure of Example 1 hereinabove, gives 5,5 - dimethyl - 10 - hydroxy - 2 - [1-(3-methyl-2-butenyl)] - 8 - (3 - methyl-2-octyl)-1,2,3,4-tetrahydro-5H - [1]benzopyrano[3,4-d]pyridine.

EXAMPLE 30

2 - [1 - (trans - 3 - chloro - 2 - propenyl)] - 10 - hydroxy - 8 - (3 - methyl - 2 - octyl) - 5 - oxo - 1,2,3,4-tetrahydro-5H[1]benzopyrano[3,4-d]pyridine Following a procedure similar to that described in Example 14 above, 10-hydroxy-8-(3-methyl-2-octyl)-5-oxo - 1,2,3,4 - tetrahydro - 5H - [1]benzopyrano[3,4-d]pyridine is reacted with trans-1,3-dichloro-2-propene in absolute ethanol in the presence of anhydrous sodium carbonate to give 2-[1-(trans-3-chloro-2-propenyl)]-10-hydroxy - 8 - (3-methyl-2-octyl)-5-oxo-1,2,3,4-tetrahydro-5H-[1]benzopyrano[3,4-d]pyridine.

The latter, on reaction with methyl magnesium iodide according to the procedure described in Example 1 hereinabove, gives 2-[1-(trans-3-chloro-2-propenyl)]-5,5-dimethyl - 10 - hydroxy - 8 - (3 - methyl-2-octyl)-1,2,3,4-tetrahydro-5H-[1]benzopyrano[3,4-d]pyridine.

EXAMPLE 31

2 - [1 - (cis - 3 - chloro - 2 - propenyl)] - 10 - hydroxy-8 - (3 - methyl - 2 - octyl) - 5 - oxo - 1,2,3,4 - tetrahydro-5H-[1]benzopyrano[3,4-d]pyridine Following a procedure similar to that described in Example 14 hereinabove, 10-hydroxy-8-(3-methyl-2-octyl)-5 - oxo - 1,2,3,4 - tetrahydro - 5H-[1]benzopyrano[3,4-d]pyridine is reacted with cis-1,3-dichloro-2-propene in absolute ethanol in the presence of anhydrous sodium carbonate to give 2-[1-(cis-3-chloro-2-propenyl)]-10-hydroxy - 8 - (3 - methyl - 2 - octyl)-5-oxo-1,2,3,4-tetrahydro-5H-[1]benzopyrano[3,4-d]pyridine.

The latter, on reaction with methyl magnesium iodide according to the procedure of Example 1 hereinabove, gives 2 - [1 - (cis - 3 - chloro - 2 - propenyl)]-5,5-dimethyl - 10 - hydroxy - 8 - (3 - methyl-2-octyl)-1,2,3,4-tetrahydro-5H-[1]benzopyrano[3,4-d]pyridine.

EXAMPLE 32

2 - cyclobutylmethyl - 10 - hydroxy - 8 - (3 - methyl - 2 - octyl) - 5 - oxo - 1,2,3,4 - tetrahydro - 5H - [1]benzopyrano[3,4-d]pyridine Following a procedure similar to that described in Example 14 hereinabove, 10-hydroxy-8-(3-methyl-2-octyl) - 5 - oxo - 1,2,3,4-tetrahydro-5H-[1]benzopyrano[3,4-d]pyridine is reacted with cyclobutylmethyl chloride in absolute ethanol in the presence of sodium carbonate to give 2 - cyclobutylmethyl - 10-hydroxy-8-(3-methyl-2-octyl) - 5 - oxo - 1,2,3,4 - tetrahydro - 5H - [1]benzopyrano[3,4-d]pyridine.

The latter, on reaction with methyl magnesium iodide according to the procedure described in Example 1 above, gives 2 - cyclobutylmethyl - 5,5 - dimethyl - 10 - hydroxy - 8 - (3 - methyl-2-octyl)-1,2,3,4-tetrahydro-5H-[1]benzopyrano[3,4-d]pyridine.

EXAMPLE 33

2 - cyclopropylmethyl - 10 - hydroxy - 8 - (3 - methyl-2 - octyl) - 5 - oxo - 1,2,3,4 - tetrahydro - 5H - [1]benzopyrano[3,4-d]pyridine Following a procedure similar to that described in Example 14 hereinabove, 10-hydroxy-8-(3-methyl-2-octyl) - 5 - oxo - 1,2,3,4 - tetrahydro - 5H - [1]benzopyrano[3,4-d]pyridine is reacted with cyclopropylmethyl chloride in absolute ethanol in the presence of sodium carbonate to give 2-cyclopropylmethyl-10-hydroxy-8-(3-methyl - 2 - octyl) - 5 - oxo-1,2,3,4-tetrahydro-5H-[1]benzopyrano[3,4-d]pyridine.

The latter, on reaction with methyl magnesium iodide according to the procedure described in Example 1 hereinabove, gives 2 - cyclopropylmethyl - 5,5 - dimethyl-10-hydroxy - 8 - (3 - methyl - 2 - octyl)-1,2,3,4-tetrahydro-5H-[1]benzopyrano[3,4-d]pyridine.

EXAMPLE 34

10 - hydroxy - 8 - (3 - methyl - 2 - octyl) - 5 - oxo - 2-[1 - (3 - phenyl - 2 - propynyl)] - 1,2,3,4 - tetrahydro-5H-[1]benzopyrano[3,4-d]pyridine Following a procedure similar to that described in Example 14 hereinabove, 10-hydroxy - 8 - (3-methyl-2-octyl) - 5 - oxo - 1,2,3,4 - tetrahydro-5H-[1]benzopyrano [3,4-d]pyridine is reacted with 3-phenyl-2-propynyl bromide in absolute ethanol in the presence of anhydrous sodium carbonate to give 10-hydroxy-8-(3-methyl-2-octyl) - 5 - oxo - 2 - [1-(3-phenyl-2-propynyl)]-1,2,3,4-tetrahydro-5H-[1]benzopyrano[3,4-d]pyridine.

The latter, on reaction with methyl magnesium iodide according to the procedure described in Example 1 hereinabove, gives 5,5 - dimethyl-10-hydroxy-8-(3-methyl-2-octyl) - 2 - [1 - (3 - phenyl-2-propynyl)]-1,2,3,4-tetrahydro-5H-[1]benzopyrano[3,4-d]pyridine.

EXAMPLE 35

10 - hydroxy - 8 - (3 - methyl - 2 - octyl) - 5 - oxo - 2-{1 - [3 - (2,4,6 - trimethylphenyl)-2-propynyl}-1,2,3,4 - tetrahydro - 5H - [1]benzopyrano[3,4-d]pyridine Following a procedure similar to that described in Example 14 hereinabove, 10 - hydroxy - 8-(3-methyl-2-octyl) - 5 - oxo - 1,2,3,4 - tetrahydro - 5H - [1]benzopyrano[3,4-d]pyridine is reacted with 3-bromo-1-mesityl-1-propyne in absolute ethanol in the presence of anhydrous sodium carbonate to give 10-hydroxy-8-(3-methyl-2-octyl) - 5 - oxo - 2 - {1-[3-(2,4,6-trimethylphenyl)-2-propynyl]} - 1,2,3,4 - tetrahydro - 5H - [1]benzopyrano[3,4-d]pyridine.

The latter, on reaction with methyl magnesium iodide according to the procedure described in Example 1 hereinabove, gives 5,5 - dimethyl - 10 - hydroxy - 8 - (3-methyl - 2 - octyl) - 2 - {1 - [3 - (2,4,6-trimethylphenyl)-2 - propynyl]} - 1,2,3,4 - tetrahydro - 5H - [1]benzopyrano[3,4-d]pyridine.

EXAMPLE 36

10 - hydroxy - 8 - (3 - methyl - 2 - octyl) - 5 - oxo - 2-{1 - [3 - (4 - methylphenyl) - 2 - propynyl]} - 1,2,3,4-tetrahydro-5H-[1]benzopyrano[3,4-d]pyridine Following a procedure similar to that described in Example 14 hereinabove, 10 - hydroxy - 8 - (3-methyl-2-octyl) - 5 - oxo - 1,2,3,4 - tetrahydro-5H-[1]benzopyrano[3,4-d]pyridine is reacted with 3-chloro-1-(4-methylphenyl)-1-propyne in absolute ethanol in the presence of anhydrous sodium carbonate to give 10-hydroxy-8-(3-methyl - 2 - octyl) - 5 - oxo - 2 - {1-[3-(4-methylphenyl)-2 - propynyl]} - 1,2,3,4 - tetrahydro - 5H - [1]benzopyrano [3,4-d]pyridine.

The latter, on reaction with methyl magnesium iodide according to the procedure described above in Example 1, gives 5,5-dimethyl-10-hydroxy-8-(3-methyl-2-octyl)-2-{1-

[3 - (4 - methylphenyl)-2-propynyl]}-1,2,3,4-tetrahydro-5H-[1]benzopyrano[3,4-d]pyridine.

We claim:

1. A compound having the formula

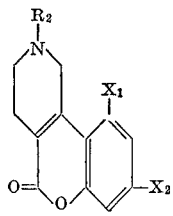

wherein $X_1$ is hydroxy; $X_2$ is a member of the group consisting of alkyl having from one to twenty carbon atoms and cycloalkyl-lower-alkyl wherein the cycloalkyl moiety contains from three to eight ring carbon atoms; and $R_2$ is a member of the group consisting of cycloalkyl-lower-alkyl, lower-alkenyl, lower-alkynyl, halo-lower-alkenyl, phenyl-lower-alkyl, and phenyl-lower-alkynyl, and wherein the benzene ring of the phenyl-lower-alkyl and phenyl-lower-alkynyl groups are unsubstituted or substituted by from one to three members of the group consisting of lower-alkyl, lower-alkoxy, halo, nitro, lower-alkyl-mercapto, methylenedioxy, and trifluoromethyl.

2. A compound according to claim 1 wherein $X_1$ is hydroxy; $X_2$ is the same as in claim 1 and $R_1$ is an alkyl group having from one to twenty carbon atoms and cycloalkyl-lower-alkyl wherein the cycloalkyl moiety contains three to eight ring carbon atoms.

3. A compound according to claim 2 wherein $R_2$ is lower-alkynyl.

4. 10-hydroxy-8-(3-methyl-2-octyl)-2-[1-(2-propynyl)]-5-oxo-1,2,3,4 - tetrahydro-5H-[1]benzopyrano[3,4-d]pyridine according to claim 3 wherein $R_1$ is 3-methyl-2-octyl, and $R_2$ is 1-(2-propynyl).

References Cited

UNITED STATES PATENTS 3,429,889    2/1969    Shulgin _____ 260—295

ALAN L. ROTMAN, Primary Examiner

U.S. Cl. X.R.

260—239.5, 240, 257, 270, 294.8, 294.9, 297; 424—254, 266